(12) United States Patent
Shiner et al.

(10) Patent No.: US 10,809,150 B2
(45) Date of Patent: Oct. 20, 2020

(54) METHODS AND ASSEMBLIES FOR USING ELECTROSTRICTION TO CHARACTERIZE PROPERTIES OF OPTICAL FIBER

(71) Applicant: Ciena Corporation, Hanover, MD (US)

(72) Inventors: Andrew D. Shiner, Ottawa (CA); Michael Andrew Reimer, Stittsville (CA); Maurice O'Sullivan, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/552,099

(22) Filed: Aug. 27, 2019

(65) Prior Publication Data

US 2019/0383699 A1 Dec. 19, 2019

Related U.S. Application Data

(63) Continuation of application No. 15/828,497, filed on Dec. 1, 2017, now Pat. No. 10,444,114.

(51) Int. Cl.
*G01N 21/00* (2006.01)
*G01M 11/00* (2006.01)

(52) U.S. Cl.
CPC ................... *G01M 11/33* (2013.01)

(58) Field of Classification Search
CPC .. G01N 21/253; G01N 21/0303; G01N 21/05; G01N 21/03; G01N 30/74
USPC ...................................................... 356/73.1
See application file for complete search history.

(56) References Cited

U.S. PATENT DOCUMENTS

| | | |
|---|---|---|
| 7,352,971 B2 | 4/2008 | Roberts et al. |
| 9,143,238 B2 | 9/2015 | Roberts et al. |
| 9,319,137 B2 | 4/2016 | Zhuge et al. |
| 9,749,058 B2 | 8/2017 | Reimer et al. |
| 9,768,875 B2 | 9/2017 | Zhuge et al. |
| 9,768,880 B2 | 9/2017 | Zhuge et al. |
| 2017/0310390 A1 | 10/2017 | Shiner et al. |

OTHER PUBLICATIONS

A. Melloni et al., "Frequency characterization of the nonlinear refractive index in optical fiber." Fiber & Integrated Optics 18.1 (1999): 1-13.
E. M. Dianov et al. "Long-range interaction of picosecond solitons through excitation of acoustic waves in optical fibers." Applied Physics B: Lasers and Optics 54.2 (1992): 175-180.
(Continued)

*Primary Examiner* — Md M Rahman
(74) *Attorney, Agent, or Firm* — Clements Bernard Walker; Lawrence A. Baratta, Jr.; Christopher L. Bernard

(57) ABSTRACT

Systems and method include a detector communicatively coupled to a fiber span; and processing circuitry connected to the detector and configured to digitally sample and process an output of the detector, detect phase changes in the output, and identify an electrostrictive response of the fiber span based on the detected phase changes and based on a dependence of the detected phase changes with frequency. A property of the fiber span can be determined on the electrostrictive response. The property of the optical fiber can include one or more of optical fiber material type, optical fiber material property, optical fiber area, optical fiber geometry, optical fiber condition, optical fiber stress and strain, optical fiber temperature. and optical fiber radiation exposure.

18 Claims, 12 Drawing Sheets

(56) References Cited

OTHER PUBLICATIONS

R. Hui et al. "Characterization of electrostriction nonlinearity in a standard single-mode fiber based on cross-phase modulation." Optical Fiber Communication Conference. Optical Society of America, 2015.
X. Bao et al "Recent progress in Brillouin scattering based fiber sensors." Sensors 11.4 (2011): 4152-4187.
Agilent Technologies, Agilent 86038B Photonic Dispersion and Loss Analyzer User's Guide (2009).
M. Ohashi "Fiber Measurement Technique Based on OTDR." Current Developments in Optical Fiber Technology. InTech, 2013.

METHODS AND ASSEMBLIES FOR USING ELECTROSTRICTION TO CHARACTERIZE PROPERTIES OF OPTICAL FIBER

CROSS-REFERENCE TO RELATED APPLICATIONS

The present disclosure is a continuation of U.S. patent application Ser. No. 15/828,497, filed Dec. 1, 2017, and entitled "Methods and assemblies for using electrostriction to characterize properties of optical fiber," the contents of which are incorporated herein by reference.

FIELD OF THE DISCLOSURE

The present disclosure relates generally to methods and assemblies for determining a property of an optical fiber used in a fiber optic communication system. More specifically, the present disclosure relates to methods and assemblies for measuring the frequency dependent electrostrictive response of an optical fiber and using those measurements to determine properties of that fiber such as the fiber type. Advantageously, fiber type within a span can be used to determine optimum link capacity and provisioning. The determination of other optical fiber properties is also explored.

BACKGROUND OF THE DISCLOSURE

In optical fibers, the nonlinear interaction within and between channels is primarily mediated by the intensity dependent refractive index, $n_2$. For intensity modulation frequencies below about 1 GHz, $n_2$ includes contributions from the electronic response of the material, $n_{2k}$, as well as the electrostrictive response of the material, nee. The electrostrictive response of the material has a strong frequency dependence, which is dependent upon the fiber geometry, material selection, and guided mode field distribution. By measuring the frequency dependence of the nonlinear refractive index, it is possible to extract a signature that enables determination of the fiber type and other properties in a deployed cable.

When a light pulse passes through an optical fiber it induces a force pushing the glass atoms toward a high intensity region in the center of the fiber. Following the light pulse, the glass relaxes and an acoustic pressure wave travels in a radial direction from the center of the fiber to the cladding boundary, where the acoustic pressure wave is partially reflected. The details of the fiber geometry, along with the material acoustic wave velocities, define resonance conditions for the transverse acoustic wave. This situation is analogous to the acoustic modes of a drum. A pulse train that is resonant with one of the acoustic modes induces a standing wave at the frequency of the pulse train. The mechanical response of the glass to light is referred to as electrostriction which produces an intensity dependent refractive index $n_{2e}$ that can be as much as 50% of the total intensity dependent refractive index at excitation frequencies below ~1 GHz. A plot of the real and imaginary components of $n_{2e}(\Omega)$ is provided in FIG. 1.

The electrostrictive response of an optical fiber can be measured from the frequency dependence of nonlinear effects, such as self phase modulation (SPM) and cross phase modulation (XPM). The strength of, $n_{2e}(\Omega)$, is governed by the overlap integral between the radial acoustic wave eigen function and the transverse intensity distribution of the optical field in the fiber. The oscillations in $n_{2e}(\Omega)$ diminish to extinction the spatial period of the associated acoustic modes drops below the fiber spot size. The contrast of the modes of $n_{2e}(\Omega)$, and particularly the frequency where the contrast vanishes, is indicative of the type of fiber under test. A full derivation of $n_{2e}(\Omega)$ is provided in the relevant art. The simulation results described herein below all assume a step index fiber geometry with a peak real component of $n_{2e}(\Omega)$ of $1.7 \cdot 10^{-20}$ W/m² as taken from the relevant art. Recent work puts this value at $\sim 0.6 \cdot 10^{-20}$ W/m². Differences in the peak value rescale the results shown, but do not change the frequency dependence.

The present disclosure provides that the contrast of the frequency dependent response, which is defined as (max−min)/(max+min) as a function of eigenmode order, can be used to differentiate between fiber types and determine other fiber properties. Differences caused by overall scale factors or non-step index fiber geometries aid in fiber type classification, for example. FIG. 2 shows the frequency dependences of the real part of the nonlinear refractive index due to electrostriction for various fiber types. It is found that oscillation extinguish at lower frequencies for fibers with large core size as compared with the $n_{2e}$ response for small core fibers, such as true wave classic (TWC) fiber.

BRIEF SUMMARY OF THE DISCLOSURE

In optical fibers, the nonlinear interaction within and between channels is primarily mediated by the intensity dependent refractive index, $n_2$. For intensity modulation frequencies below about 1 GHz, $n_2$ includes contributions from the electronic response of the material, $n_{2k}$, as well as the electrostrictive response of the material, nee. The electrostrictive response of the material has a strong frequency dependence, which is dependent upon the fiber geometry, material selection, and guided mode field distribution. By measuring the frequency dependence of the nonlinear refractive index, it is possible to extract a signature that enables determination of the fiber type and other properties in a deployed cable. The present disclosure provides that the contrast of the frequency dependent response, which is defined as (max−min)/(max+min) in the vicinity of an eigenmode and as a function of eigenmode order, can be used to differentiate between fiber types and determine other fiber properties. Differences caused by overall scale factors or non-step index fiber geometries aid in fiber type classification, for example.

In one exemplary embodiment, a system includes a detector communicatively coupled to a fiber span; and processing circuitry connected to the detector and configured to digitally sample and process an output of the detector, detect phase changes in the output, and identify an electrostrictive response of the fiber span based on the detected phase changes and based on a dependence of the detected phase changes with frequency. The system can further include a local oscillator (LO) or laser communicatively coupled to the detector for combination with an output of the fiber span. The detector can be configured to detect an intensity modulated tone injected into the fiber span. The intensity modulated tone can be provided on a service channel and extracted and provider to the detector. The detector can be configured to detect one of a phase modulated waveform injected into the fiber span and a data carrying waveform injected into the fiber span. The processing circuitry can be further configured to determine a property of the fiber span based on the electrostrictive response. The property of the optical fiber can include one or more of optical fiber material type, optical fiber material property, optical fiber area, optical fiber geometry, optical fiber condition, optical fiber stress and strain, optical fiber temperature. and optical fiber radiation exposure. The processing circuitry can be configured to identify the electrostrictive response based on a measurement of nonlinear interaction of a modulated waveform either with itself through self-phase modulation or with another propagating field through cross phase modulation.

In another exemplary embodiment, a non-transitory computer-readable medium includes computer readable code stored thereon for programming a processor to perform functions including digitally sampling and processing an output of a detector communicatively coupled to a fiber span, detecting phase changes in the output, and identifying an electrostrictive response of the fiber span based on the detected phase changes and based on a dependence of the detected phase changes with frequency. In a further exemplary embodiment, a method includes digitally sampling and processing an output of a detector communicatively coupled to a fiber span, detecting phase changes in the output, and identifying an electrostrictive response of the fiber span based on the detected phase changes and based on a dependence of the detected phase changes with frequency.

In one exemplary embodiment, the present disclosure provides a method for determining a property or environment of an optical fiber, including: measuring a frequency dependent electrostrictive response of an optical fiber; and based on the measured frequency dependent electrostrictive response, determining a property or environment of the optical fiber. The property or environment can be used in operation of a system over the optical fiber. The property of the optical fiber includes but is not limited to one or more of optical fiber type, optical fiber material type, optical fiber material property, optical fiber waveguide property, optical fiber guided wave property, optical fiber geometry, optical fiber condition, optical fiber stress and strain, optical fiber temperature, and optical fiber radiation exposure. The environment of the optical fiber included but is not limited to optical fiber environment, optical fiber routing, and optical fiber spooling. The measurement of the frequency dependent electrostrictive response of the optical fiber includes measuring either nonlinear interaction of a modulated waveform with itself through self-phase-modulation (SPM) or nonlinear interaction of a modulated waveform with a waveform propagating at a different wavelength through cross-phase-modulation (XPM). The measurement of the frequency dependent electrostrictive response of the optical fiber further includes monitoring strength of the nonlinear interaction as a function of modulation frequency. When the nonlinear interaction is with an intensity modulated tone, the frequency of the intensity modulated tone can be based on a frequency at which the frequency dependent electrostrictive response is to be measured. Optionally, a phase change induced on a propagated field is observed by combining the propagated field with a local oscillator on a square law detector. The phase change induced on the propagated field is observed through one of heterodyne detection, homodyne detection, and coherent detection using an optical hybrid. The measurement of the frequency dependent electrostrictive response of the optical fiber further includes comparing an observed frequency dependent electrostrictive response of the optical fiber to one or more models using an empirical fitting method including but not restricted to one or more of a polynomial method, fitting to radial basis functions, a neural network method, a linear method, and a nonlinear method. Optionally, the method still further includes modifying the one or more models based on observations of the measuring of the frequency dependent electrostrictive response of the optical fiber. Alternatively, the measurement of the frequency dependent electrostrictive response of the optical fiber further includes observing the nonlinear interaction based on properties of the noise on a propagated waveform such as frequency dependent amplitude, correlation etc.

In another exemplary embodiment, the present disclosure provides an assembly for determining a property of an optical fiber, including: a measuring mechanism for measuring a frequency dependent electrostrictive response of an optical fiber; and a determining algorithm for, based on the measured frequency dependent electrostrictive response, determining a property of the optical fiber.

The measuring mechanism includes: a first amplifier and a second amplifier disposed at opposed ends of a fiber span carrying a channel; one or more lasers operable for generating a modulated waveform such, as an intensity modulated tone, and injecting it into the channel at the first amplifier and generating a local oscillator that is combined with the intensity modulated tone extracted at the second amplifier; and a photodiode operable for receiving the modulated waveform and the local oscillator; wherein phase changes detected at the photodiode are in part attributable to nonlinear effects associated with the frequency dependent electrostrictive response of the fiber span. Optionally, the fiber span is a compensated link including a span of positive dispersion fiber and a span of negative dispersion fiber.

Alternatively, the measuring mechanism includes: a first amplifier and a second amplifier disposed at opposed ends of a fiber span carrying a channel; a laser operable for generating a modulated waveform, such as an intensity modulated tone, with one or more continuous wave components and injecting that waveform it into the channel at the first amplifier, wherein the intensity modulated waveform is extracted at the second amplifier; and a homodyne square law detector operable for receiving the intensity modulated waveform after it is extracted at the second amplifier; wherein phase changes detected at the homodyne square law detector are in part attributable to nonlinear effects associated with the frequency dependent electrostrictive response of the fiber span. In this scenario the continuous wave component can be any combination of frequencies which mix with the modulated waveform in the square law detector to produce features in the intensity spectrum which are characteristic of the nonlinear phase shift from propagation. Optionally, the fiber span is a compensated link including a span of positive dispersion fiber and a span of negative dispersion fiber.

Alternatively, the measuring mechanism includes: a modulated pump waveform propagating at a first channel wavelength on the optical fiber; and a probe waveform propagating at a second channel at different wavelengths on the optical fiber; wherein the first channel wavelength and the second channel wavelength experience cross phase modulation and the modulated pump waveform induces correlated phase noise on the probe waveform that oscillates with the period of the intensity modulated pump waveform; and wherein a measured peak to valley ratio as a function of tone frequency provides a measure of the frequency dependent electrostrictive response of the optical fiber. Optionally, the optical fiber includes multiple spans. The modulated pump waveform can be blocked between adjacent spans or different probe waveforms are utilized for different spans.

BRIEF DESCRIPTION OF THE DRAWINGS

The present disclosure is illustrated and described herein with reference to the various drawings, in which like reference numbers are used to denote like method steps/assembly components, as appropriate, and in which.

DETAILED DESCRIPTION OF THE DISCLOSURE

Again, the electrostrictive response of an optical fiber can be measured from the frequency dependence of the nonlinear phase shift induced through processes such as SPM and XPM, and is proportional to $n_{2e}(\Omega)$. The strength of $n_{2e}(\Omega)$ is governed by the overlap integral between the radial acoustic wave eigen functions and the transverse distribution of the optical field in the fiber. The oscillations in $n_{2e}(\Omega)$ diminish to extinction when the spatial period of the associated acoustic modes drops below the fiber spot size. The contrast of the modes of $n_{2e}(\Omega)$, and particularly the frequency of extinction, is indicative of the type of fiber under test, for example. A full derivation of $n_{2e}(\Omega)$ is provided in the relevant art. The simulation results described herein below all assume a step index fiber geometry with a peak real component of $1.7 \cdot 10^{-20}$ W/m$^2$ as taken from the relevant art. Recent work puts this value at ~$0.6 \cdot 10^{-20}$ W/m$^2$. Differences in the peak value rescale the results shown, but do not change the frequency dependence.

The present disclosure provides that the contrast of the frequency dependent response, which is defined as (max−min)/(max+min) in the vicinity of an eigenmode resonance and as a function of eigenmode order, can be used to differentiate between fiber types and determine other fiber properties. Differences caused by overall scale factors or non-step index fiber geometries aid in fiber type classification, for example. Various methodologies for measuring $n_{2e}$ in deployed fibers are provided herein accordingly.

Figure 1:
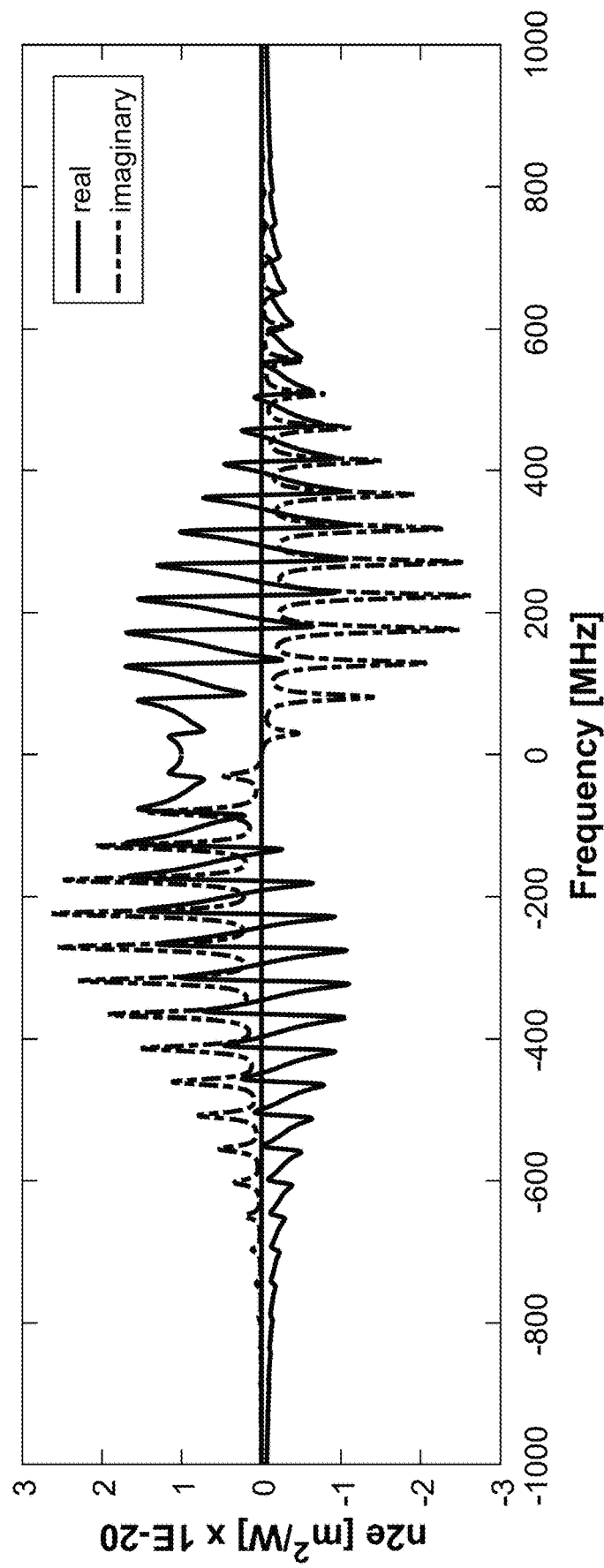
FIG. 1 is a plot of the real and imaginary components of the electrostrictive response of non-dispersion shifted fiber (NDSF), where the calculated response is normalized such that the real component attains a maximum value of $1.7 \cdot 10^{-20}$ W/m$^2$.
Figure 2:
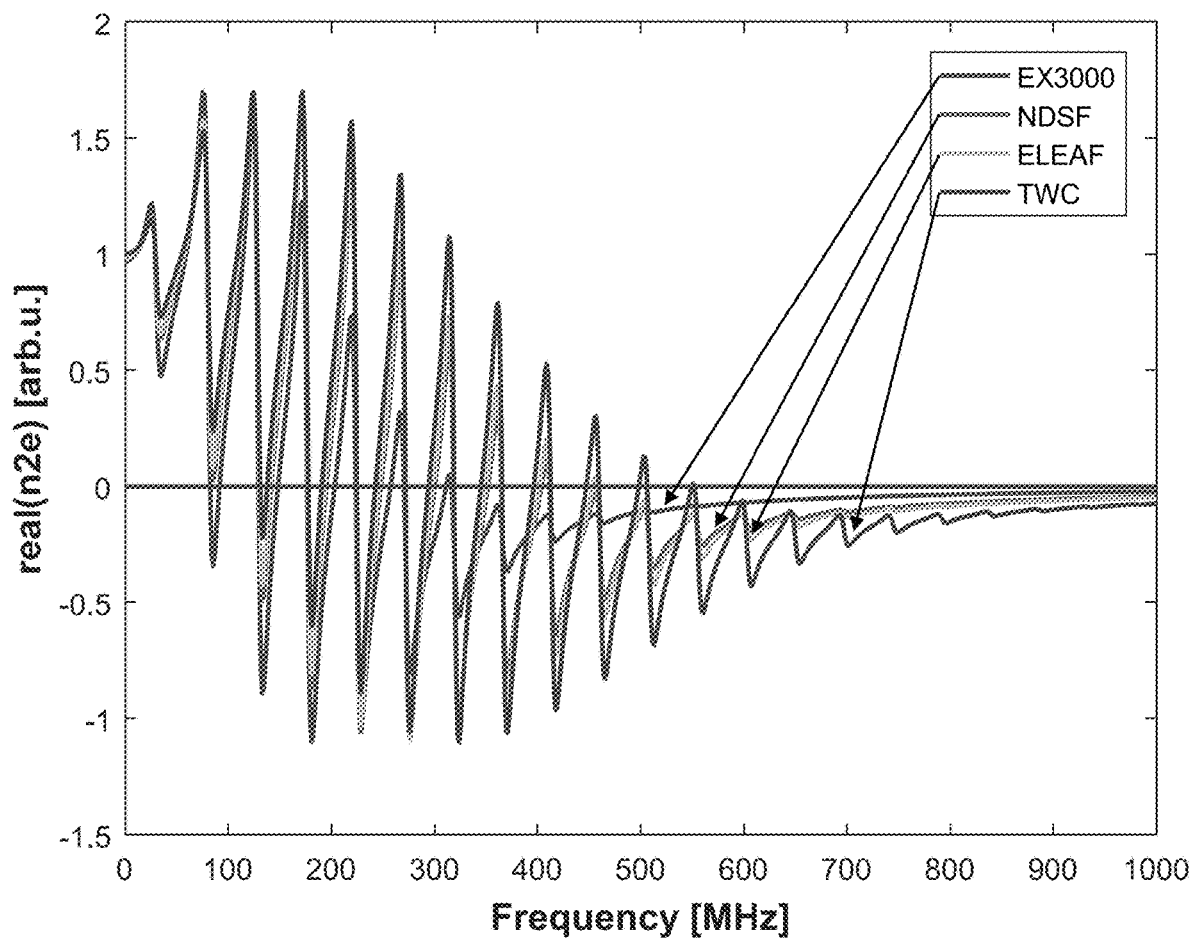
FIG. 2 is a plot of the frequency dependences of the real part of nonlinear refractive index due to electrostriction for various fiber types.
Figure 3:
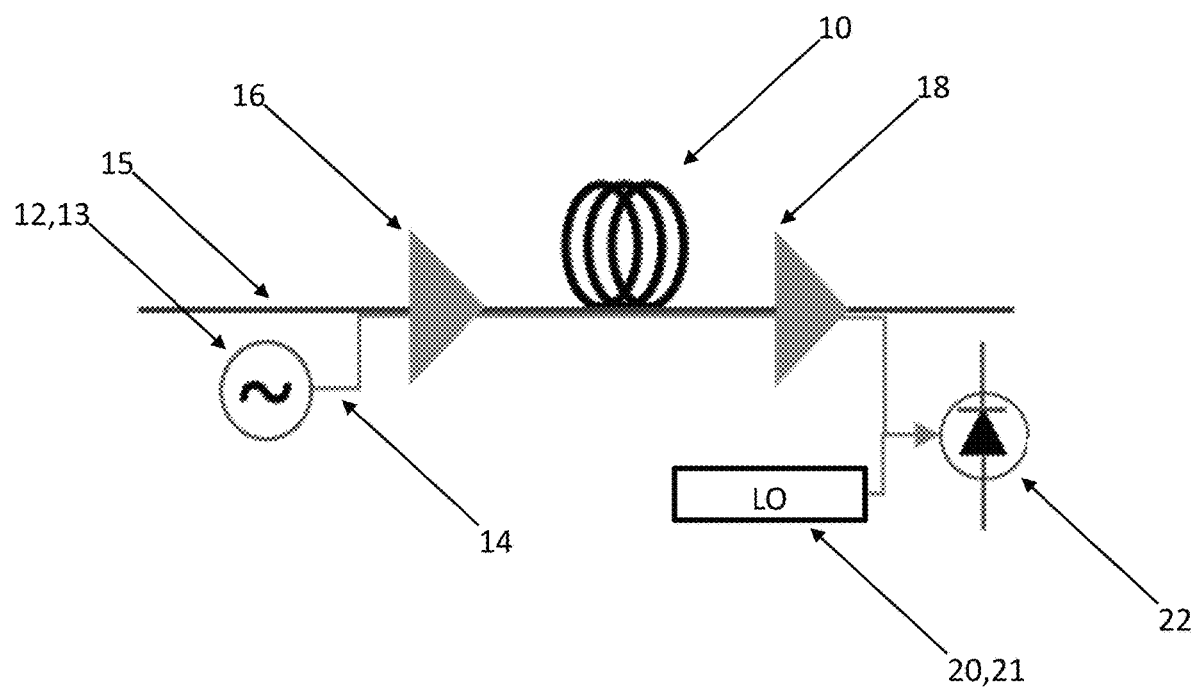
FIG. 3 is a schematic diagram illustrating one exemplary embodiment of an assembly for performing coherent detection using a local oscillator (LO) such that the frequency dependence of the nonlinear refractive index can be determined and fiber type distinguished in accordance with the present disclosure.

Referring now specifically to FIG. 3, in one exemplary embodiment, fiber type or other property or environment sensing within a given fiber span 10 can be performed by injecting an intensity modulated tone 12 into a service (or other) channel 14 that is multiplexed onto the fiber span 10 along with (optionally) other traffic carrying channels 15. The intensity modulated tone 12 is generated by a first laser 13 and injected into the service channel 14 at a first amplifier 16, for example, such as an erbium doped fiber amplifier (EDFA) or the like. Following propagation through the fiber span 10, the intensity modulated tone 12 is extracted from the service channel 14 at a second amplifier 18, for example, such as another EDFA or the like. The intensity modulated tone 12 is then combined with a LO 20 and directed onto a photodiode 22. The heterodyne beat note is digitally sampled and processed. It should be noted that a laser 13 within a given amplifier 16,18 can be used for the receiver LO 20 for a detector 22 and can also generate a modulated waveform for propagation through the next span. Detected phase changes in the intensity modulated tone 12 are in part attributable to nonlinear effects. The dependence of the observed phase changes with tone modulation frequency are observed to help identify the part of the phase change that is attributable to electrostriction. It should be noted that homodyne detection where the modulation index is reduced to less than 100% can also be utilized, in which case an LO 20 at the receiver is not required. It is also noted that the intensity modulated tone could be replaced with other types of modulated waveforms such as phase modulated waveforms or those carrying data. The service channel 14 can be an optical service channel (OSC) which is used for communications between amplifier sites.

Figure 4:
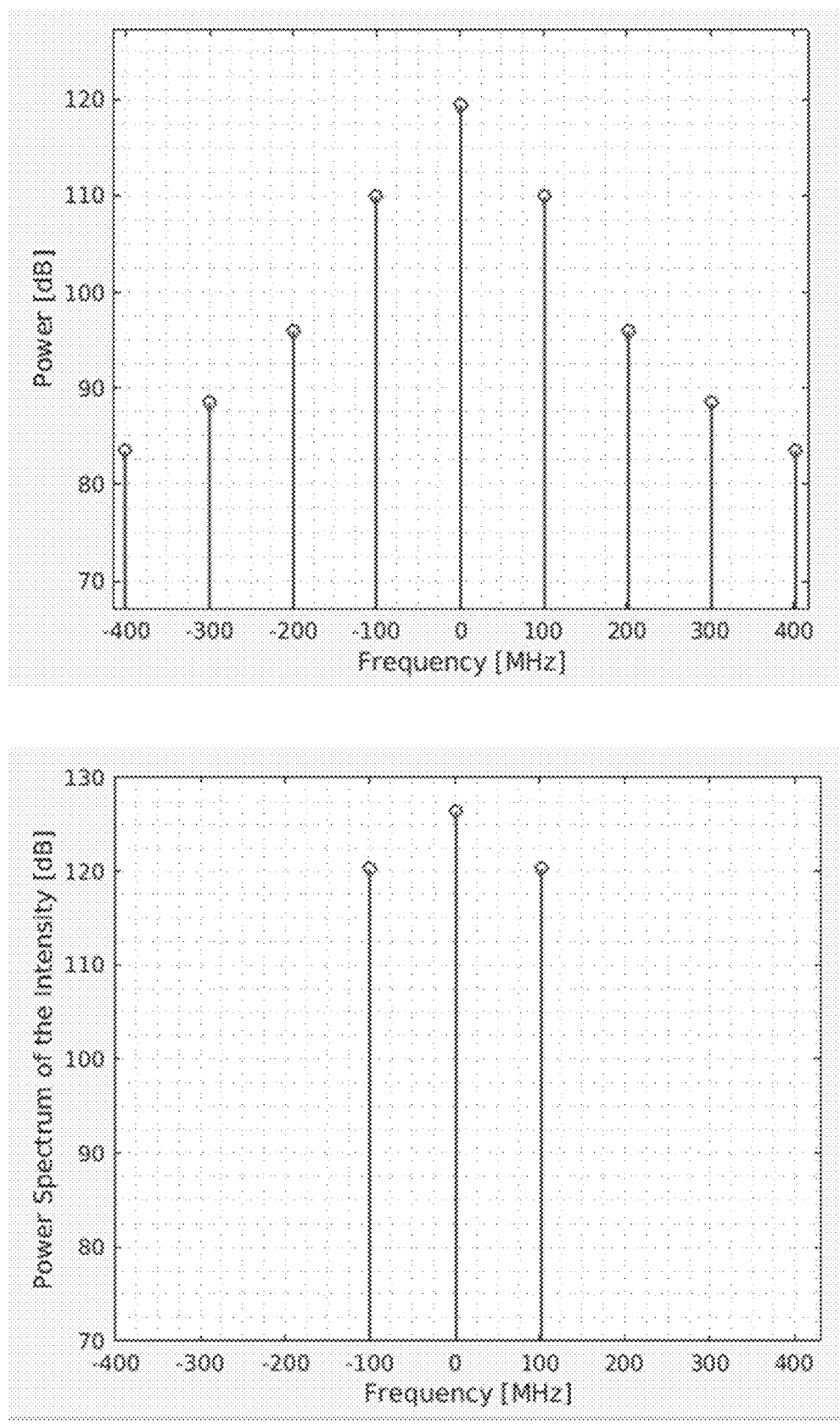
FIG. 4 is a series of plots of (top) the power spectrum of the field, A(t), for a 100 MHz intensity modulated tone and (bottom) the power spectrum of the intensity, $I(t) \propto |A(t)|^2$, that would correspond to the measured power spectrum without a LO (100% modulation index)
Figure 5:
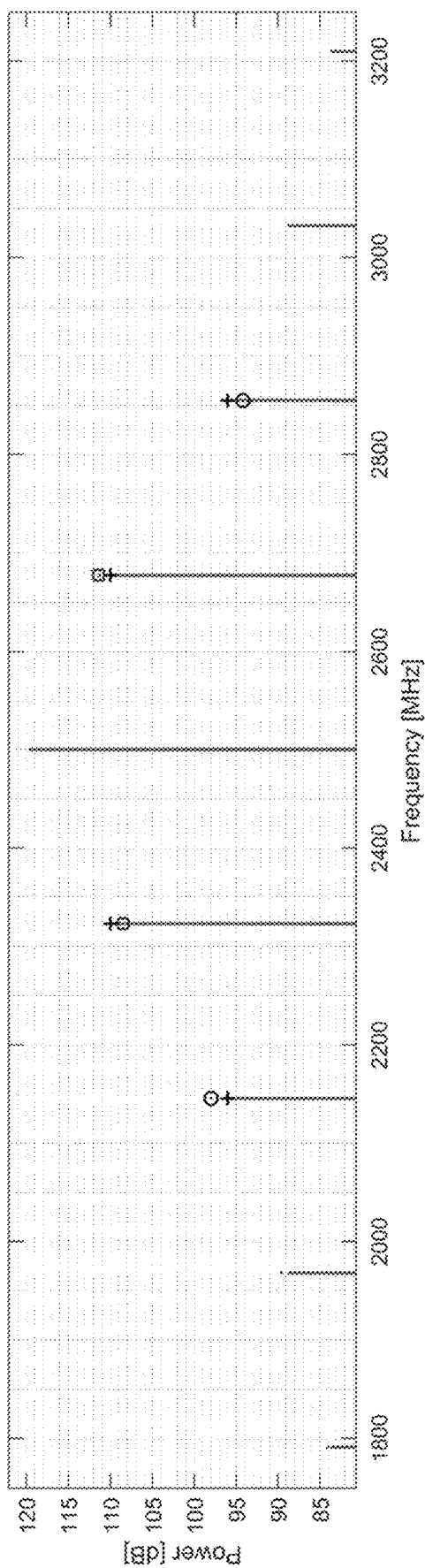
FIG. 5 is a plot of the power spectrum of the heterodyne beat note between a received field and the LO following square law detection—the intermodulation frequency (IF) is 178 MHz; the solid line is the spectrum that would be observed following linear propagation through the channel; the dots correspond to the spectrum following nonlinear propagation; the squares correspond to the spectrum following nonlinear propagation at the tone frequencies (IF+/−178 MHz); and the circles are at the second harmonic of the tone frequency (IF+/−2*178 MHz)

The power spectrum of the field (top) and intensity (bottom) of an exemplary 100 MHz intensity modulated waveform is shown in FIG. 4. During propagation, the nonlinear response of the fiber causes an intensity dependent phase shift in the laser field, which can be observed as an increase in the field power spectral density at the second harmonic of the tone frequency (shifted by the IF). Detection of this phase shift requires a coherent reference. For this example, the coherent reference is provided by the LO, $A_{LO}(t)$, which combines with the propagated field, A(t), in the photodiode 22, which measures the intensity $I(t) \propto \Delta(t)+A_{LO}(t)|^2$. The intensity, I(t), contains mixing products of the propagated field with the LO. The ratio of the fundamental to second harmonics of the tone frequencies in the power spectrum of I(t) depends on the strength of the nonlinear interaction during propagation. FIG. 5 is a plot of the power spectrum of the heterodyne beat note between a received field and the LO following square law detection—the IF is 2.5 GHz; the solid line is the spectrum that would be observed following linear propagation through the channel; the dots correspond to the spectrum following nonlinear propagation; the squares correspond to the spectrum following nonlinear propagation at the tone frequencies (IF+/−178 MHz); and the circles are at the second harmonic of the tone frequency (IF+/−2*178 MHz).

The tone frequency, $f_t$, and its harmonics are visible on either side of the IF. The strength of this nonlinear interaction is modulated by the magnitude of $n_{2e}$ at the tone frequency. The ratio of the second harmonic to the fundamental tone powers, as a function of tone frequency, is plotted for four different fiber types in FIG. 6. In all cases, a 6 dBm launch power was used and the $n_{2e}$ response modeled with a stepped index fiber with core radius defined by $A_{eff}$ and a peak electrostrictive response of $1.7 \cdot 10^{-20}$ $W/m^2$.

The ratio of the fundamental to second harmonic tone powers are modulated by the frequency dependent $n_{2e}$ response. The peaks correspond to the frequencies of eigenmodes of the transverse acoustic waves induced in the fiber.

Figure 6:
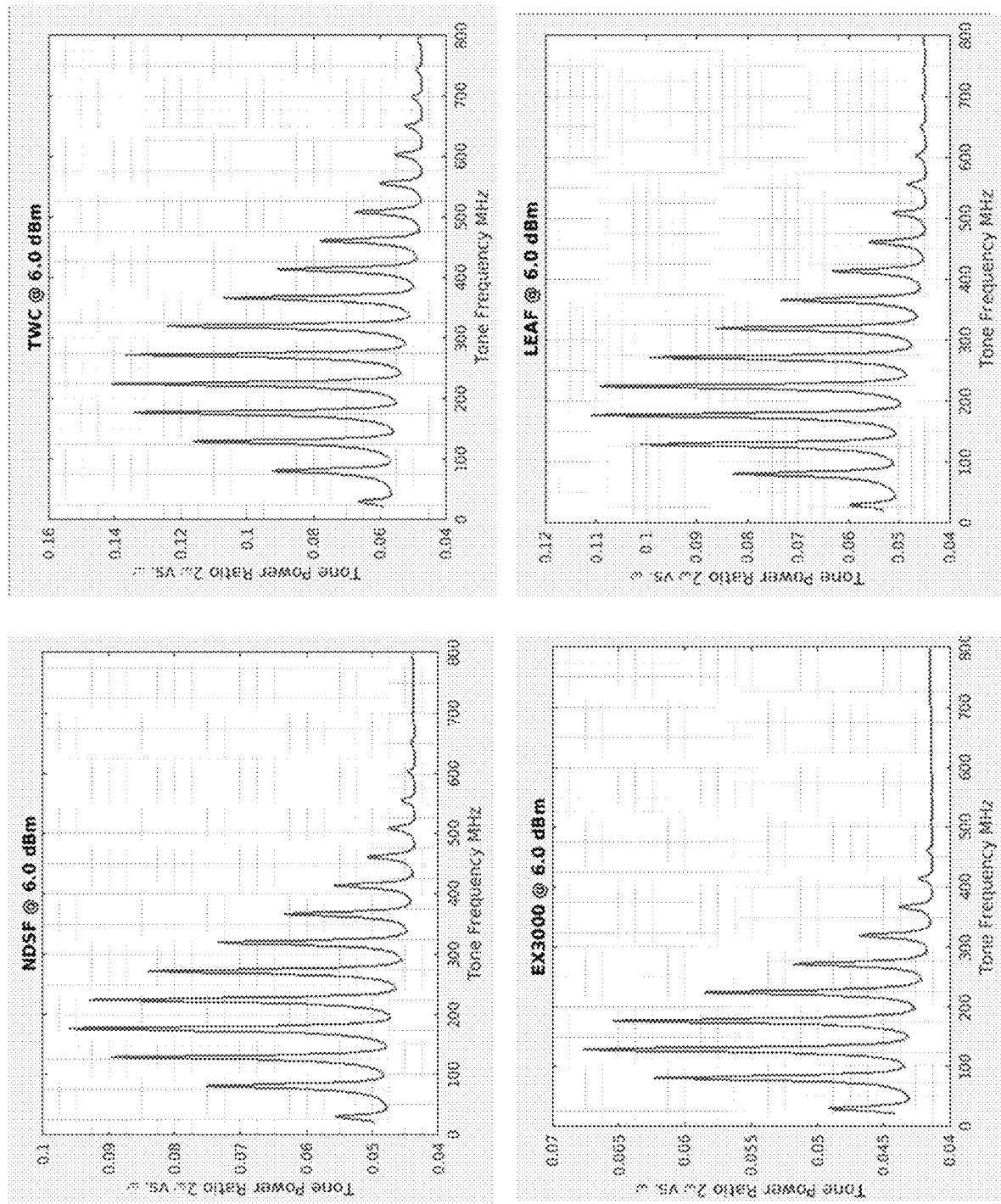
FIG. 6 is a series of plots of the second harmonic to fundamental in the power spectrum of I(t) as a function of tone frequency for various fiber types.
Figure 7:
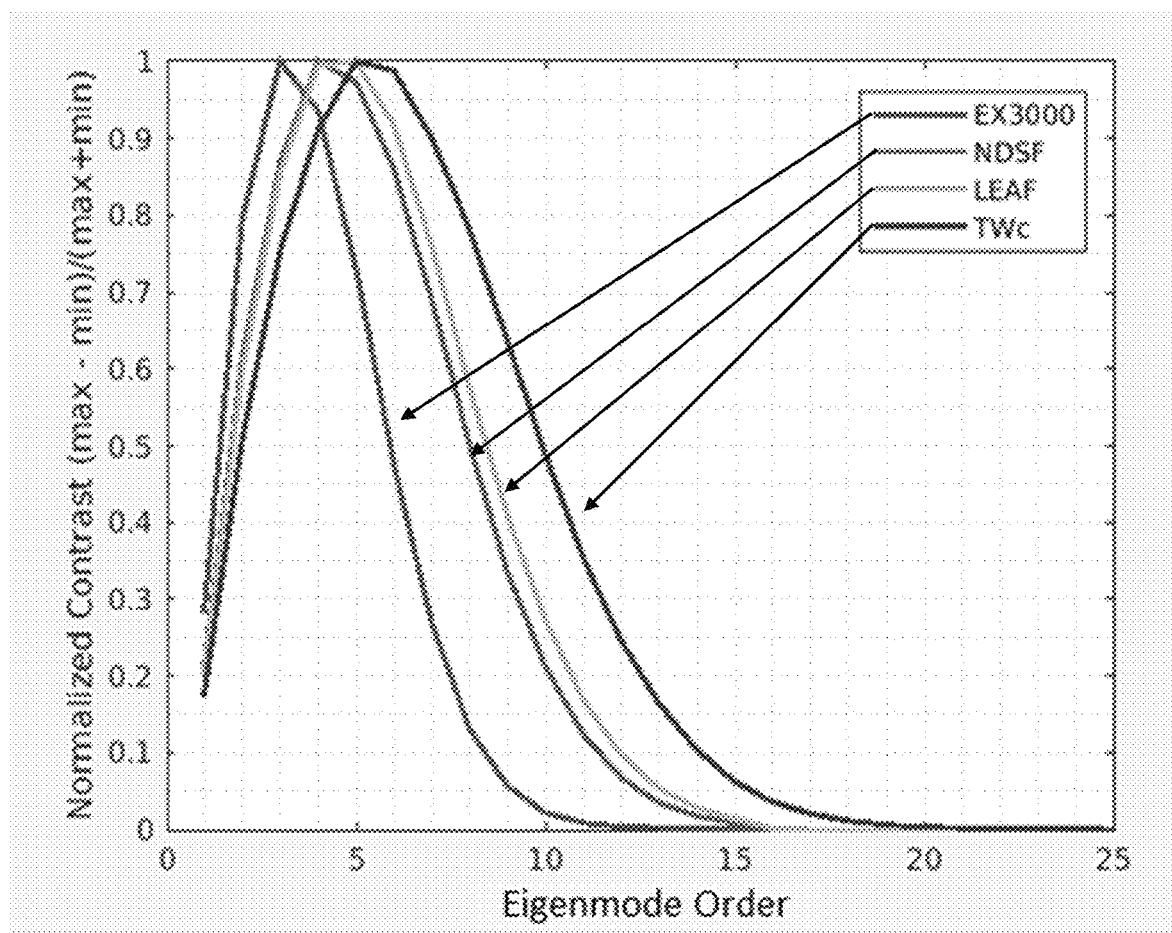
FIG. 7 is a plot of $n_{2e}$ contrast normalized to peak contrast as a function of acoustic mode order.

For a given eigen mode, m, the $n_{2e}$ contrast, v(m), is defined in terms of the ratio of fundamental to second harmonic tone powers (c.f. FIG. 6) as the ratio v (m)=(max−min/(max+min). The $n_{2e}$ contrast for NDSF, large effective area fiber (LEAF), Vascade EX3000, and TWC, all with a launch power of +6 dBm, is shown in FIG. 7. The $n_{2e}$ contrast is unique for each of the fiber types tested. It is noted that the detected second harmonic tone power is a few percent of the fundamental and, while this is a small signal, it is also narrow band and periodic, which allows for relatively simple detection.

Figure 8:
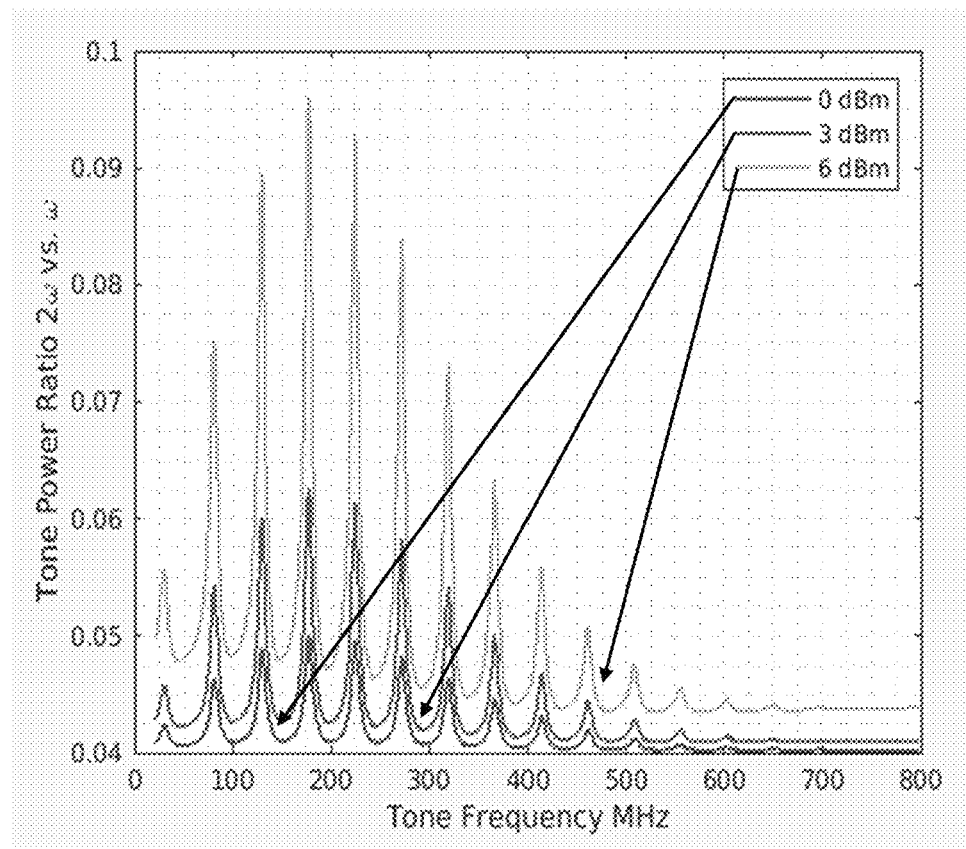
FIG. 8 is a series of plots of (top) the ratio of second harmonic to fundamental of I(t) as a function of tone frequency for various launch powers and (bottom) the corresponding normalized $n_{2e}$ contrast being relatively invariant with respect to changes in power.
Figure 8:
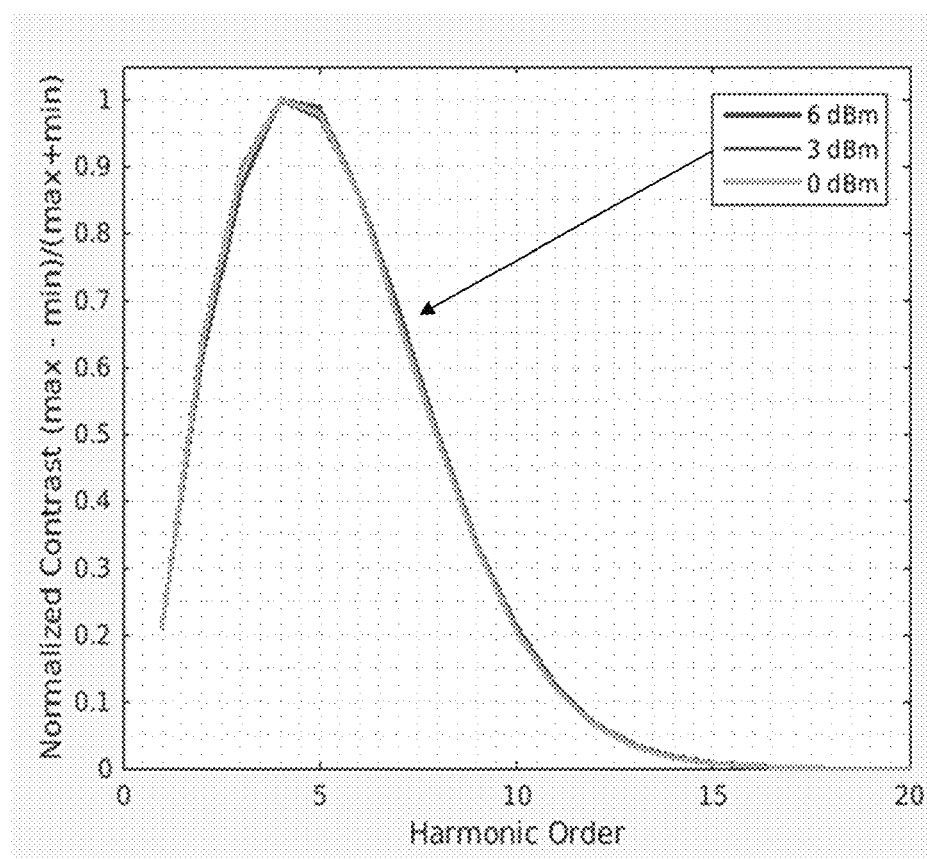

The simulation alluded to herein above for the case of NDSF fiber was repeated for three different launch powers, 0 dBm, 3 dBm, and 6 dBm. As expected, the ratio of fundamental to second harmonic power increases with increasing launch power, as shown in FIG. 8 (top). The normalized contrast, as shown in FIG. 8 (bottom), is relatively invariant to changes in power.

Figure 9:
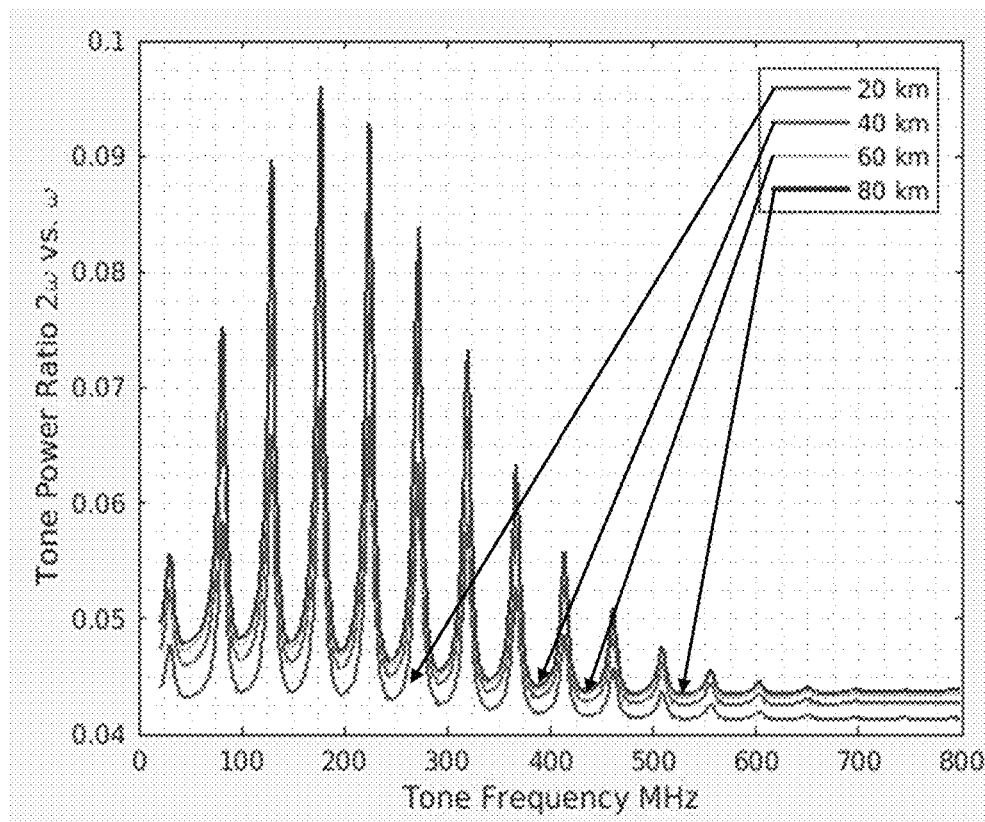
FIG. 9 is a series of plots of (top) the ratio of second harmonic to fundamental of I(t) as a function of tone frequency for a 6 dBm tone propagating through various lengths of NDSF fiber and (bottom) the corresponding normalized $n_{2e}$ contrast being relatively invariant with respect to changes in span length.
Figure 9:
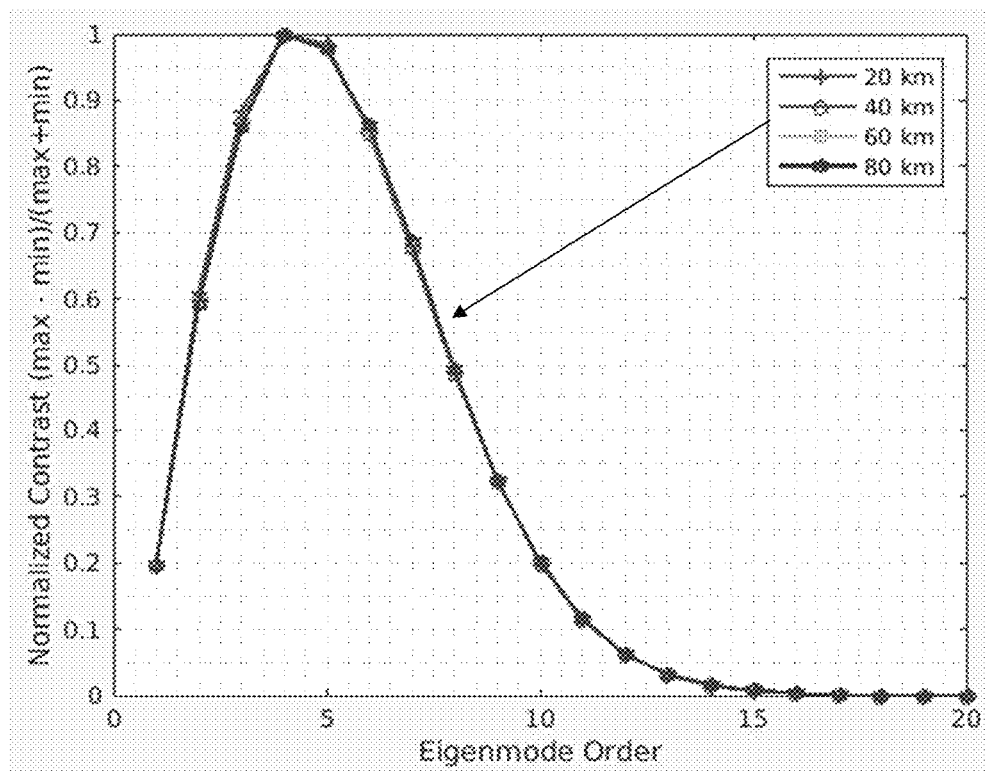

The simulation alluded to herein above for the case of NDSF fiber was repeated for four different span lengths, 20 km, 40 km, 60 km, and 80 km, using a +6 dBm launch power for all cases. The normalized contrast, as shown in FIG. 9 (bottom), is relatively invariant to changes in fiber length.

Figure 10:
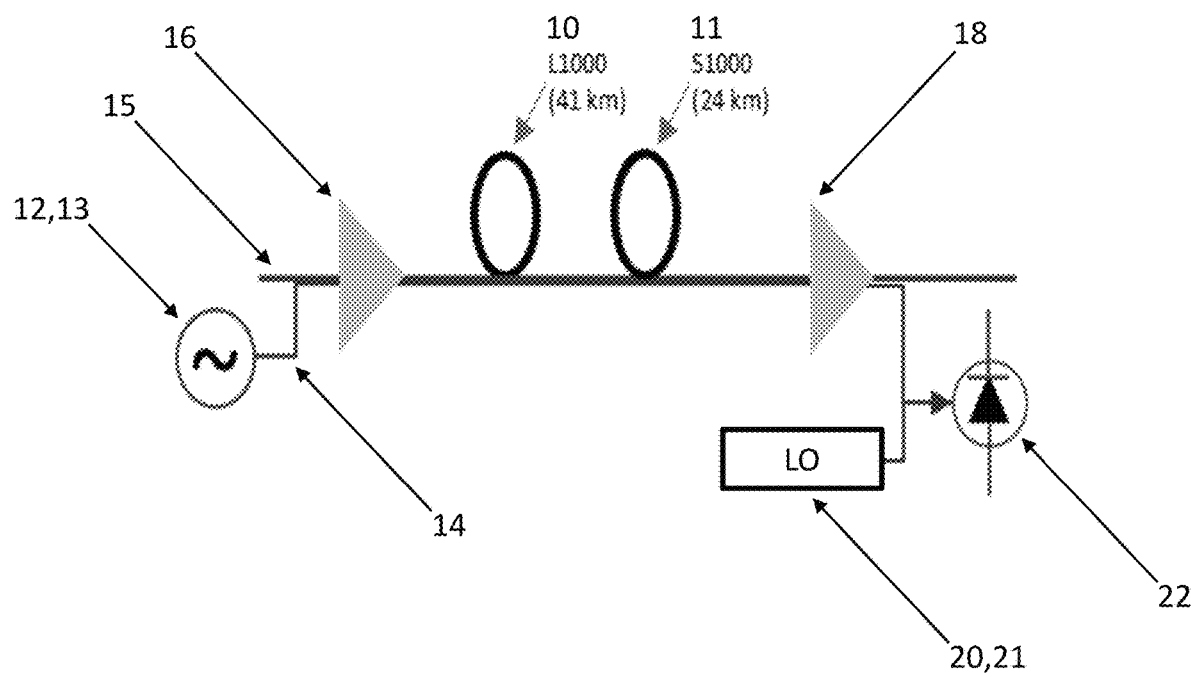
FIG. 10 is a schematic diagram illustrating another exemplary embodiment of an assembly for performing intensity detection on a compensated link using a LO such that the frequency dependence of the nonlinear refractive index can be determined and fiber type distinguished in accordance with the present disclosure.
Figure 11:
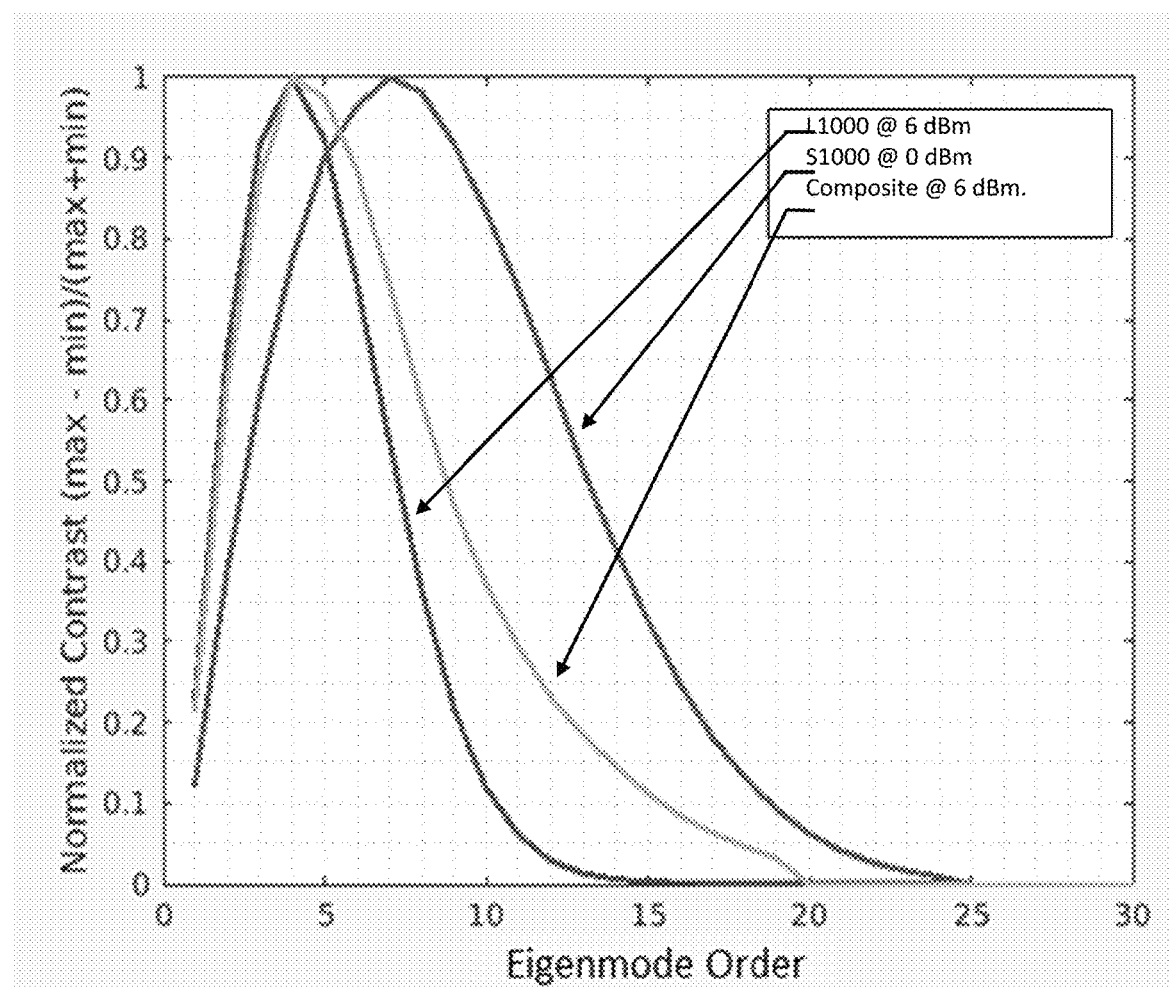
FIG. 11 is a plot of the normalized $n_{2e}$ contrast for a compensated span, as well as for similar lengths of the two fiber types used to construct the span; the compensated span exhibiting an inflection at around mode 12.

Compensated links consist of spans of positive and negative dispersion fiber. This example considers one span of a composite link that is comprised of 40.6 km of Vascade L1000 ($A_{eff} \approx 100$ μm$^2$) 10 followed by 24.3 km of Vascade S1000 ($A_{eff} \approx 27$ μm$^2$) 11, as shown in FIG. 10. The harmonic contrast for the span (65 km combined) is plotted along with results for 65 km of L1000 @ 6 dBm as well as for 65 km of S1000 @ 0 dBm. The power for a span of pure S1000 fiber is lowered in consideration of the fact that a 6 dBm launch power would greatly exceed the nominal launch power for such a fiber given its small effective area. Results are shown in FIG. 11, where it is observed that relatively high $n_{2e}$ contrast is maintained for higher order harmonics in the smaller core S1000 fiber as compared with the L1000 results. Results for the composite span show an inflection at around order 12, indicating that one can readily distinguish between pure and composite spans.

Thus, an intensity modulated tone can excite the frequency dependent $n_{2e}(\Omega)$ response of a fiber and the response can be used to distinguish between fiber types. The response can be measured with a photodiode 22 (FIGS. 3 and 10) through a heterodyne measurement with a LO 20, for example. The modulated tone 12 can be generated with a directly modulated laser 13, and a single laser 21 located within each amplifier can serve as a source as well as the LO 20. The measured $n_{2e}$ contrast is shown to be largely independent of launch power and span length.

The $n_{2e}(\Omega)$ response of a fiber can also be measured through the XPM interaction between an intensity modulated (pump) waveform propagating at one wavelength and a (probe) waveform propagating at a different wavelength. In this example, the probe consists of a dual polarization QPSK waveform located on ITU channel 51 and the pump is located on channel 50. Interaction with the pump induces correlated phase noise on the probe that oscillates with the period of the pump waveform. By measuring the peak to valley ratio as a function of the tone frequency, one can extract a measure of the $n_{2e}$ response.

Figure 12:
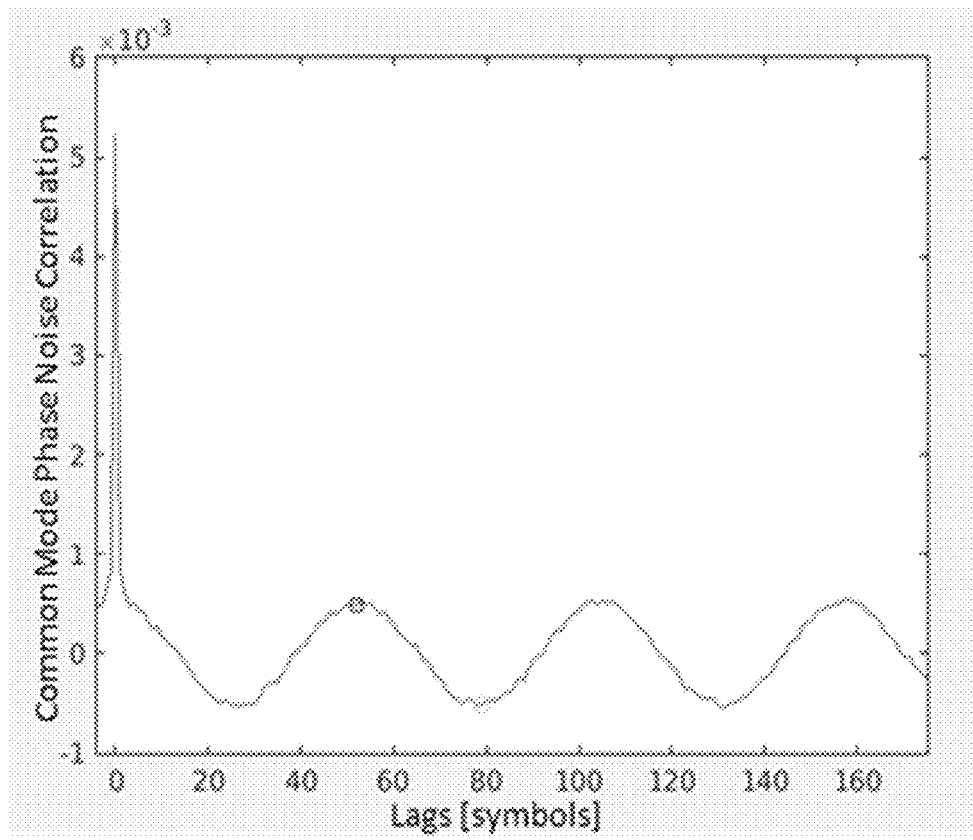
FIG. 12 is a series of plots of (top) the phase noise correlation induced by a modulated pump on a quadrature phase shift keyed (QPSK) probe channel showing the peak and valley at the tone frequency and (bottom) the difference between the peak and valley in noise correlation for NDSF and TWC as a function of tone frequency
Figure 12:
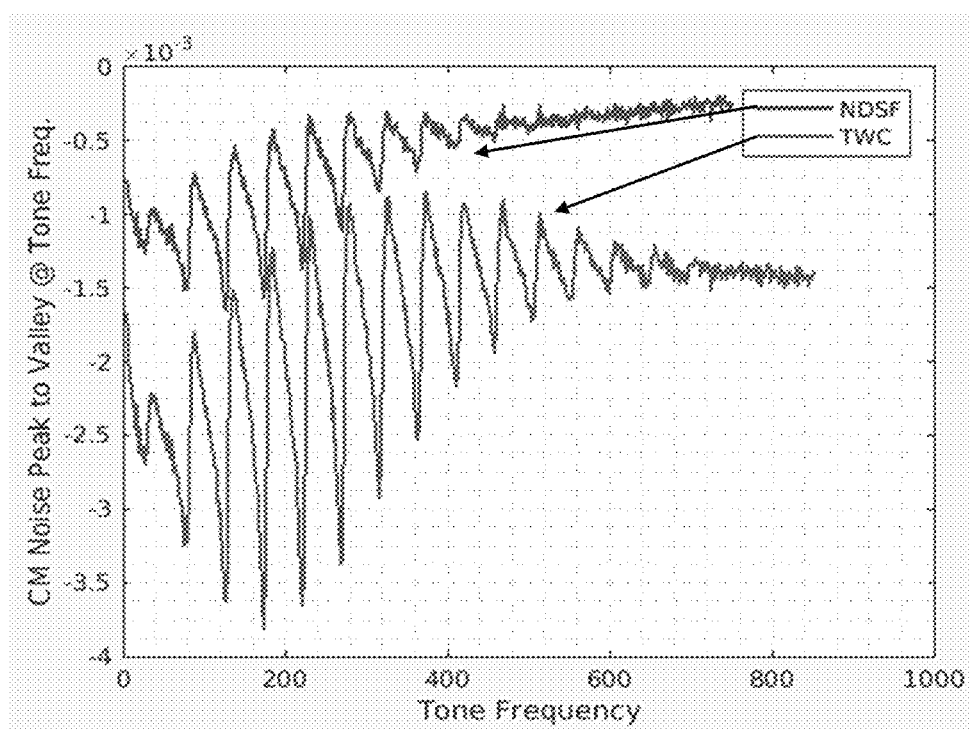

FIG. 12 shows the phase noise correlation measured on QPSK symbols following propagation with an intensity modulated pump. The difference between the peak and the valley as a function of tone frequency is shown in the bottom plot. The ratio reflects the frequency dependence of $n_{2e}$ and the oscillations extend to higher frequencies for TWC as compared with the result for NDSF, as expected, given the smaller core size of TWC.

The ability to measure phase noise correlation requires the functionality to measure received symbols from a burst and compare the measured symbols with associated symbols synthesized from their associated estimated (Pre-forward error correction, Pre-FEC) or, advantageously, error free (Post FEC) bits to determine through subtraction the noise field at each symbol.

The pump/probe method described herein above could be of interest because it can be implemented as a special mode for coherent transceivers deployed in a link. The pump waveform can be injected into a service (or other) channel in one of the spans of the link or the noise correlation can be measured for co-propagating pump and probe waveforms as the pump is successively blocked at different add/drop or equalization sites.

In general, the frequency dependent $n_{2e}$ response of a link can be useful for characterizing the nonlinear propagation characteristics of the link, for example, it could be used to determine optical power or to aid in determining the nonlinear c-matrix coefficients for operation of a fiber optic communication system. Measurements of the noise power as a function of frequency can be useful for separating the contribution of nonlinear noise, which is modulated by the $n_{2e}$ response from amplified spontaneous emission (ASE) noise that is not modulated. The normalized contrast can be used as an input into a neural network or other type of fitting algorithm to classify the fiber type. Detection of the normalized contrast for a span may be possible with an arrangement similar to that described herein above, where the intensity modulated tone is generated with a reduced modulation index, e.g., 0.1, and homodyne detection is employed using a square law detector without a LO. It is possible to measure linear effects, such as local dispersion, through the square law detection of modulated tones with or without the aid of the LO.

Thus, the present disclosure provides methods and assemblies for measuring the electrostrictive response of an optical fiber, and the use of those measurements to characterize properties or the environment of the fiber, such as the fiber type. Most persons working in telecommunications who are familiar with electrostriction recognize it by its manifestation in Stimulated Brillouin Scattering (SBS), wherein photons are scattered by phonons they produce through electrostriction. The fact that electrostriction introduces a frequency dependence in the efficiency of SPM and XPM is much less well known, and there have been no attempts to exploit this dependence for measuring the properties of a fiber. Because the electrostrictive response is closely tied to the details of the fiber geometry, it is useful for measuring fiber properties. Several fiber measurement techniques are based on observing the SBS efficiency, which can be related to properties such as temperature and strain in the fiber. These techniques look at the back-scattering efficiency of photons by acoustic phonons. The techniques require high power narrow band lasers and, in most cases, spatial resolution is achieved through time gating of counter propagating waves on polarization maintaining fiber. Fiber dispersion can also be measured by observing the phase shift between tones that propagate with a known frequency separation. The optical path length of a fiber can be measured using optical time domain reflectometry (OTDR). Finally, fiber dispersion can be estimated by comparing the differences in propagation delays for pulses propagating through the same fiber at different wavelengths. Measurements based on SBS, however, usually require high power narrow linewidth lasers and in many cases require polarization maintaining fiber. SBS based measurement techniques are difficult to adapt to deployed telecommunications fiber. By combining OTDR and dispersion measurements, it may be possible to infer fiber type. However, it would be difficult to identify the composition of a composite link that combines segments of different fiber types, for example, by measuring the path length and cumulative dispersion of the link.

Thus, the techniques of the present disclosure advantageously rely on measuring the frequency dependence of the electrostrictive response. Uncertainty regarding the type of fiber installed between amplifier sites, for example, is one of the main factors preventing optimal provisioning of a link. It is desirable to have a low-cost method whereby a pair of amplifiers could determine the type of fiber that is installed in between them. Other fiber properties may likewise be determined.

As stated earlier the details of the fiber geometry, along with the material acoustic wave velocities, define resonance conditions for the transverse acoustic waves. The fiber geometry and or acoustic wave velocities may be modified through the application of mechanical stress or strain to the fiber, changes in temperature or changes in the structure of the glass through radiation exposure, doping, aging etc. The sensitivity of the $n_{2e}$ response to fiber geometry and acoustic wave velocities may be exploited to sense characteristics of the fibers environment such as optical fiber routing and optical fiber spooling. Those skilled in the art will recognize that the methods and assemblies described herein for the example of fiber type sensing may be adapted in a strait forward manner for detecting other fiber properties or environmental conditions which modify the fiber geometry and or acoustic wave frequencies as evidenced through changes in $n_{2e}(\omega)$ response of the fiber.

In the foregoing descriptions, the characterization of fiber properties was described with reference to optical fiber used by a fiber optic communication system. For example, fiber optic communication systems can include Dense Wavelength Division Multiplexed (DWDM) and other types of systems which provide data transmission in local, metro, regional, long-haul, and/or submarine networks. The systems and methods described herein can be incorporated and performed through optical network elements and associated equipment therein. The measured fiber properties or environment can advantageously be used during operation of such systems for various aspects as described herein. Those skilled in the art will recognize the fiber optic communication system is an example use case. The approach described herein can be used in other systems using optical fibers such as for temperature sensing and the like.

It will be appreciated that some embodiments described herein may include one or more generic or specialized processors ("one or more processors") such as microprocessors; Central Processing Units (CPUs); Digital Signal Processors (DSPs); customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system comprising:
    a detector communicatively coupled to a fiber span; and
    processing circuitry connected to the detector and configured to
        digitally sample and process an output of the detector,
        detect phase changes in the output, and
        identify an electrostrictive response of the fiber span based on the detected
    phase changes and based on a dependence of the detected phase changes with frequency, wherein the electrostrictive response is identified based on a measurement of nonlinear interaction of a modulated waveform either with itself through self-phase modulation or with another propagating field through cross phase modulation.

2. The system of claim 1, further comprising
    a local oscillator (LO) or laser communicatively coupled to the detector for combination with an output of the fiber span.

3. The system of claim 1, wherein the detector is configured to detect an intensity modulated tone injected into the fiber span.

4. The system of claim 3, wherein the intensity modulated tone is provided on a service channel and extracted and provider to the detector.

5. The system of claim 1, wherein the detector is configured to detect one of a phase modulated waveform injected into the fiber span and a data carrying waveform injected into the fiber span.

6. The system of claim 1, wherein the processing circuitry is further configured to
    determine a property of the fiber span based on the electrostrictive response.

7. The system of claim 6, wherein the property of the optical fiber includes one or more of optical fiber material type, optical fiber material property, optical fiber area, optical fiber geometry, optical fiber condition, optical fiber stress and strain, optical fiber temperature. and optical fiber radiation exposure.

8. A non-transitory computer-readable medium having computer readable code stored thereon for programming a processor to perform
    functions comprising:
    digitally sampling and processing an output of a detector communicatively coupled to a fiber span,
    detecting phase changes in the output, and
    identifying an electrostrictive response of the fiber span based on the detected phase changes and based on a dependence of the detected phase changes with frequency, wherein the identifying the electrostrictive response is based on a measurement of nonlinear interaction of a modulated waveform either with itself through self-phase modulation or with another propagating field through cross phase modulation.

9. The non-transitory computer-readable medium of claim 8, wherein
    the detector is also communicatively coupled to a local oscillator (LO) or laser for
    combination with an output of the fiber span.

10. The non-transitory computer-readable medium of claim 8, wherein the detector is configured to detect an intensity modulated tone injected into the fiber span.

11. The non-transitory computer-readable medium of claim 10, wherein the intensity modulated tone is provided on a service channel and extracted and provider to the detector.

12. The non-transitory computer-readable medium of claim 8, wherein the detector is configured to detect one of a phase modulated waveform injected into the fiber span and a data carrying waveform injected into the fiber span.

13. The non-transitory computer-readable medium of claim 8, wherein
    the computer readable code is configured to further program the processor to
    perform functions comprising
    determining a property of the fiber span based on the electrostrictive response.

14. The non-transitory computer-readable medium of claim 13, wherein the property of the optical fiber includes one or more of optical fiber material type, optical fiber material property, optical fiber area, optical fiber geometry, optical fiber condition, optical fiber stress and strain, optical fiber temperature. and optical fiber radiation exposure.

15. A method comprising:
    digitally sampling and processing an output of a detector communicatively coupled to a fiber span,
    detecting phase changes in the output, and
    identifying an electrostrictive response of the fiber span based on the detected phase changes and based on a dependence of the detected phase changes with frequency, wherein the identifying the electrostrictive response is based on a measurement of nonlinear interaction of a modulated waveform either with itself through self-phase modulation or with another propagating field through cross phase modulation.

16. The method of claim 15, wherein the detector is also communicatively coupled to a local oscillator (LO) or laser for combination with an output of the fiber span.

17. The method of claim 15, wherein the detector is configured to detect
    one of
    an intensity modulated tone injected into the fiber span,
    a phase modulated waveform injected into the fiber span, and
    a data carrying waveform injected into the fiber span.

18. The method of claim 15, further comprising
    determining a property of the fiber span based on the electrostrictive response.

* * * * *